United States Patent
Podzikowski

(10) Patent No.: US 9,623,833 B2
(45) Date of Patent: Apr. 18, 2017

(54) AIRBAG FLAP FOLD

(71) Applicant: Toyota Motor Engineering & Manufacturing North America, Inc., Erlanger, KY (US)

(72) Inventor: Paul J. Podzikowski, Plymouth, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/857,910

(22) Filed: Sep. 18, 2015

(65) Prior Publication Data

US 2017/0080892 A1 Mar. 23, 2017

(51) Int. Cl.
*B60R 21/2334* (2011.01)
*B60R 21/201* (2011.01)
*B60R 21/16* (2006.01)

(52) U.S. Cl.
CPC ........ *B60R 21/2334* (2013.01); *B60R 21/201* (2013.01); *B60R 2021/161* (2013.01)

(58) Field of Classification Search
CPC combination set(s) only.
See application file for complete search history.

(56) References Cited

U.S. PATENT DOCUMENTS

| | | | |
|---|---|---|---|
| 6,474,686 B1 * | 11/2002 | Higuchi | B60R 21/203 280/731 |
| 6,955,377 B2 * | 10/2005 | Cooper | B60R 21/233 280/743.1 |
| 7,213,834 B2 * | 5/2007 | Mizuno | B60R 21/203 280/730.1 |
| 7,568,730 B2 * | 8/2009 | Kwon | B60R 21/205 280/728.2 |
| 7,712,781 B2 * | 5/2010 | Klinkenberger | B60R 21/231 280/743.1 |
| 7,770,925 B2 * | 8/2010 | Seymour | B60R 21/201 280/728.2 |
| 7,878,539 B2 * | 2/2011 | Maripudi | B60R 21/201 280/740 |
| 7,926,844 B2 | 4/2011 | Williams et al. | |

(Continued)

FOREIGN PATENT DOCUMENTS

DE   10353446 A1   7/2005

*Primary Examiner* — Keith Frisby
(74) *Attorney, Agent, or Firm* — Christopher G. Darrow; Darrow Mustafa PC

(57) ABSTRACT

An airbag apparatus is provided with a shaped, out-of-position (OOP) flap configured to alter a trajectory of an inflatable air cushion during deployment. The apparatus includes an airbag module with an inflator assembly. The inflatable cushion is folded in a deflated arrangement with the airbag module, defining a major surface facing a direction of deployment. The OOP flap is shaped to cover only a partial region of the major surface. The OOP flap may include a first portion with a first end fixed to the airbag module or the inflatable cushion; and a second portion with a second end opposite the first end, remaining free from attachment. The second portion has at least one fold or cut-out at the second end and is positioned overlying the partial region of the major surface, thereby leaving at least a section of the major surface free from contact with the OOP flap.

18 Claims, 4 Drawing Sheets

(56) References Cited

U.S. PATENT DOCUMENTS

| | | | |
|---|---|---|---|
| 8,231,140 B2 | 7/2012 | Maripudi et al. | |
| 8,272,664 B2 * | 9/2012 | Benny | B60R 21/201 |
| | | | 280/728.1 |
| 8,308,188 B2 * | 11/2012 | Kumagai | B60R 21/233 |
| | | | 280/732 |
| 8,407,968 B2 * | 4/2013 | Lachat | B60R 21/201 |
| | | | 280/743.1 |
| 8,491,002 B2 | 7/2013 | Schneider et al. | |
| 8,608,195 B2 * | 12/2013 | Yamada | B60R 21/201 |
| | | | 280/732 |
| 8,764,052 B2 * | 7/2014 | Funakura | B60R 21/20 |
| | | | 280/728.3 |
| 2006/0071459 A1 * | 4/2006 | Hayakawa | B60R 21/206 |
| | | | 280/730.1 |
| 2007/0138779 A1 * | 6/2007 | Kwon | B60R 21/201 |
| | | | 280/743.2 |
| 2008/0217892 A1 | 9/2008 | Maripudi et al. | |
| 2009/0152842 A1 * | 6/2009 | Benny | B60R 21/201 |
| | | | 280/728.3 |
| 2015/0115584 A1 | 4/2015 | Smitterberg et al. | |
| 2015/0130170 A1 | 5/2015 | Kwon | |

* cited by examiner

AIRBAG FLAP FOLD

TECHNICAL FIELD

The present disclosure generally relates to airbags, and more particularly, to an apparatus and method for improving the kinematics and control of airbag deployment.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Airbag system performance may be subject to various government regulations. In certain instances, a passenger's location and position in a vehicle can affect the kinematics of an airbag's deployment. For example, an out-of-position (OOP) passenger, such as a passenger not in a normal upright and forward-facing position, can be at an increased risk of injury from an airbag. Objects such as infant car seats can also affect the proper deployment of an airbag. As a result, certain government regulations have led to the use of an OOP flap with passenger side airbags. When a passenger side airbag is deployed, the OOP flap is intended to deploy prior to the airbag cushion in order to partially cover an OOP passenger, preferably directing the airbag deployment above and/or beyond the OOP passenger, in an effort to minimize and reduce injuries. The addition of the OOP flap to an airbag system, however, can alter various timing and kinematic deployment characteristics of the airbag.

Accordingly, it would be desirable to provide an enhanced airbag system and method for improving the kinematic control of airbag deployment of airbags that include OOP flaps. It would further be desirable to improve the kinematic control, as well as certain deployment characteristics, without having to redesign or refold a particular airbag inflatable cushion.

SUMMARY

This section provides a general summary of the disclosure, and is not a comprehensive disclosure of its full scope or all of its features.

In various aspects, the present teachings provide an airbag apparatus including an airbag module with an inflator assembly. An inflatable cushion is provided, folded in a deflated arrangement with the airbag module and defining a major surface facing a direction of deployment. The airbag apparatus includes an OOP flap shaped to cover a partial region of the major surface and configured to alter a trajectory of the inflatable cushion during deployment. The OOP flap includes a first portion with a first end. The first end may be fixed to the airbag module or the inflatable cushion. The OOP flap includes a second portion with a second end. The second end is located opposite the first end and remains free from attachment during both the storage and the deployment of the inflatable cushion. The second portion may have at least one fold or cut-out at the second end, and is positioned overlying the partial region of the major surface, thereby leaving at least a section of the major surface free from contact with the OOP flap.

In other aspects, the present teachings provide a passenger side airbag apparatus including an airbag module with an inflator assembly. The apparatus may include an inflatable cushion folded in a deflated arrangement with the airbag module and defining a major surface. The major surface faces a direction of deployment and defines a surface area. The apparatus includes an OOP flap shaped to cover a partial region of the major surface and configured to alter a trajectory of the inflatable cushion during deployment. The OOP flap may include a first portion with a first end fixed to the airbag module, and a second portion with a second end. The second end is disposed opposite the first end and remains free from attachment during both storage and deployment of the inflatable cushion. The second portion may have a plurality of accordion-type folds and define opposing corners. At least one of the corners may be folded over in an inward direction, thereby leaving at least a section of the major surface free from contact with the OOP flap.

In still other aspects, the present teachings provide a method for adjusting kinematics of the deployment of a passenger side airbag with an OOP flap positioned overlying a folded inflatable cushion of an airbag apparatus. The method may include shaping the OOP flap with a plurality of accordion-type folds, and to define a contact area of the OOP flap less than a respective area of a major surface defined by the folded inflatable cushion. The method includes aligning the shaped OOP flap over major surface, thereby leaving at least a portion of the major surface free from contact with the OOP flap. In various aspects, shaping the OOP flap includes reducing the contact area by folding one or both opposing corners of the OOP flap in an inward direction. In other aspects, shaping the OOP flap includes reducing the contact area by removing a portion of material from the OOP flap. In either aspect, folding one or both opposing corners, or removing a portion of material, the reduction in contact area may delay the unfolding and/or deployment of the OOP flap, ultimately lessening any interaction between the cushion and the flap, and changing a trajectory of the airbag from the trajectory it would take without a flap being present.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
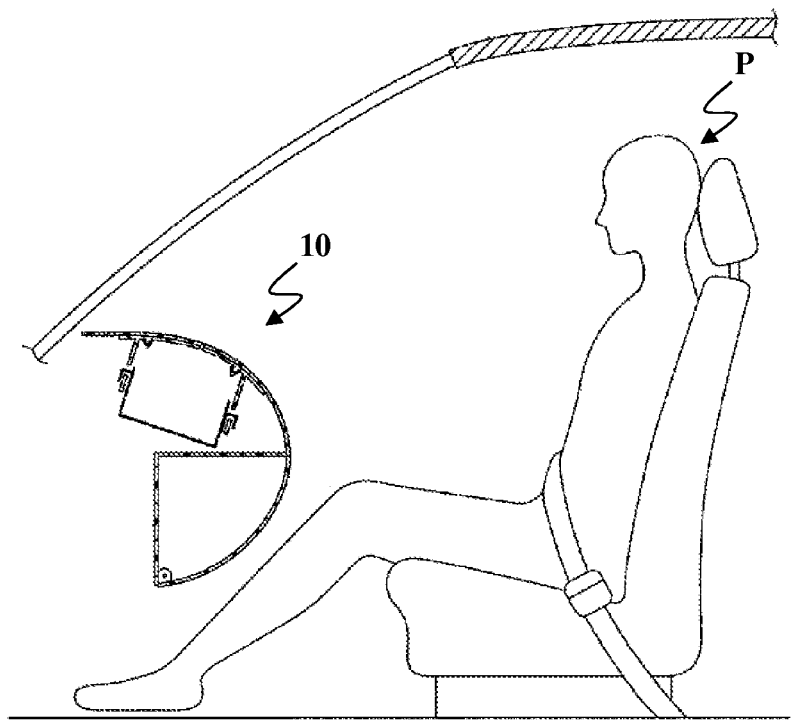
FIG. 1 is a side sectional view of a vehicle cabin with an airbag module for a front passenger occupant.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

Inflatable airbag systems are commonly used in vehicles to reduce and/or minimize driver and passenger occupant injuries in a collision. At a specific point during a collision, an airbag cushion inflates toward an occupant and provides a certain restraint and protection. Due to the nature of different sized occupants, as well as occupants that may be temporarily located in an unexpected position/placement, airbags need to be designed to accommodate a number of different situations. The present technology generally relates to controlling the kinematics of airbag deployment within a vehicle. Although the present technology may be applicable to any type of airbag, it is envisioned that the present technology may be especially applicable to front passenger side vehicle airbags that may be configured with an out-of-position (OOP) flap. As will be described in more detail below, the present teachings change the shape or fold of the OOP flap such that at least a portion of the OOP flap that would otherwise be in contact with the inflatable cushion is no longer in contact with the inflatable cushion.

For example, the corner areas of the free end of the OOP flap can be folded or otherwise directed inwardly, or a certain amount of material can be removed from one or more corner regions. Such a shape, or design, reduces a contact area between the OOP flap and the inflatable cushion. This reduction in contact area, either by folding the corners or removing an amount of material (or the like), has been shown to delay the unfolding and/or deployment of the OOP flap. Thus, the airbag may be allowed to go through an initial deployment phase with less interaction between the OOP flap and the inflatable cushion, which can significantly change the trajectory of the airbag, while still permitting the OOP flap to deploy as designed, for example, in order to cover an OOP passenger's head.

As used herein, the term "vehicle" should be construed having a broad meaning, and should include all types of vehicles, with non-limiting examples including a passenger or commercial automobile, car, truck, motorcycle, off-road vehicle, bus, boat, airplane, helicopter, lawn mower, recreational vehicle, amusement park vehicle, farm vehicle, construction vehicle, tram, golf cart, train, or trolley, etc. In various instances, vehicles useful with the present technology may be partially or fully autonomous vehicles.

Figure 2:
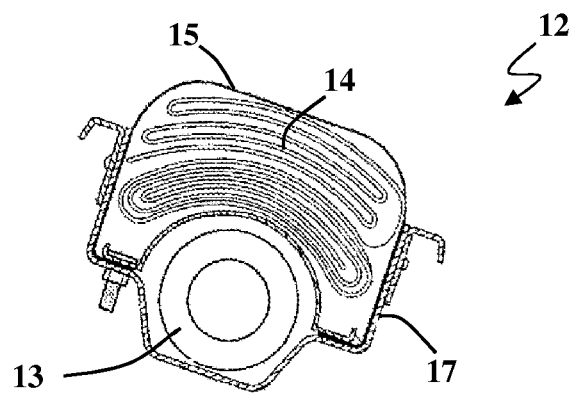
FIG. 2 is a simplified schematic view of an airbag module with an inflatable cushion and inflator assembly.

FIG. 1 is a side sectional view of a vehicle cabin with an exemplary airbag apparatus 10 coupled adjacent a transversely extending instrument panel for protection of a front passenger, P. FIG. 2 is a simplified schematic view of the airbag apparatus 10, which may generally include an airbag module 12 configured to store and deploy a folded, inflatable airbag cushion 14 using an inflator assembly 13. The airbag module 12 may include a cover 15, such as a thin, flexible dust cover to protect the inflatable cushion 14, as well as a retainer case or housing 17 that attaches the inflator assembly 13 together with the inflatable cushion 14. The airbag module 12 may also include any other necessary attachment components, such as brackets, fasteners, and other subassemblies that may be used to couple the airbag module 12 to a dashboard or instrument panel.

Figure 3:
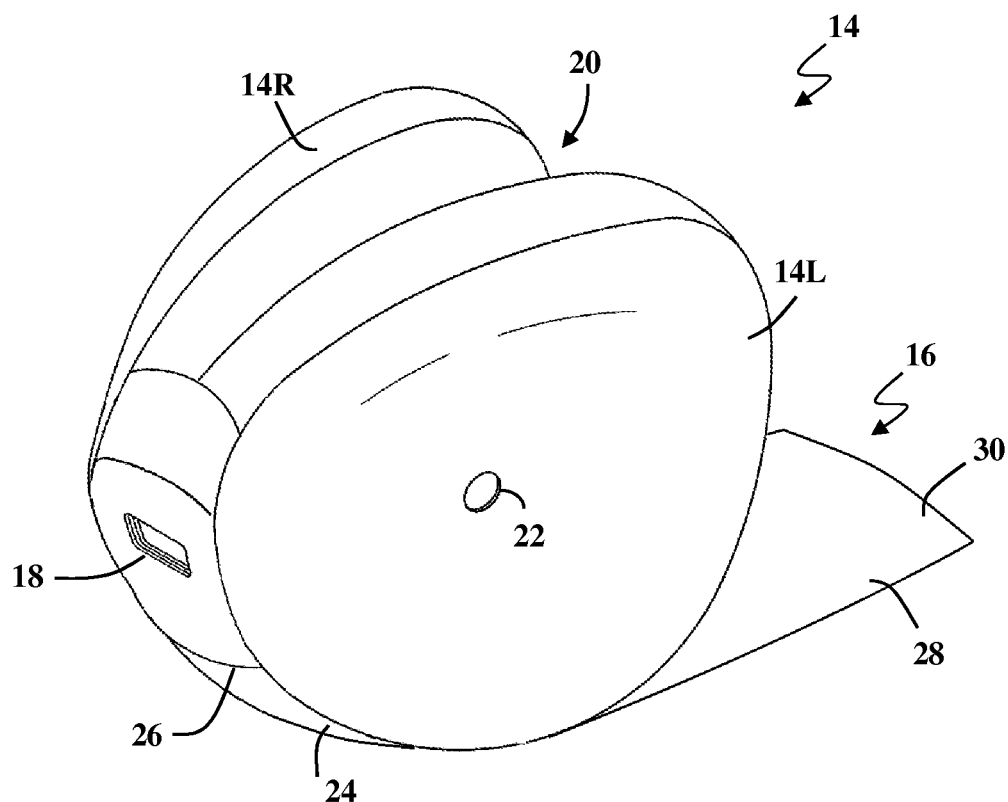
FIG. 3 is an exemplary passenger side airbag inflatable cushion, in an inflated state, and an out-of-position (OOP) flap useful with the teachings of the present technology.

FIG. 3 is an exemplary passenger side airbag inflatable cushion, shown in an inflated state, with an out-of-position (OOP) flap 16 useful with the teachings of the present technology. As shown, the OOP flap 16 may extend a distance in a forward direction, and toward a front passenger. The airbag module 12 of the present teachings may be provided with any suitable inflator as part of the inflator assembly 13, such that it is configured to abruptly fill an inflatable airbag cushion 14 with an inflation gas through a gas inlet port 18 of the inflatable cushion 14. In one example, the inflator may be a pyrotechnic inflator configured to rapidly produce enough inflation gas to fill the airbag cushion 14 to a predetermined volume.

The inflatable cushion 14 may be provided with any suitable number of sections of material shaped and sewn to form shaped extensions as is known in the art, such as a right region 14R and a left region 14L, separated by a recessed region or gap 20. The inflatable cushion may be provided with suitable vents 22 on one or more side areas, based on the particular design. Internally, the inflatable cushion 14 may be provided with any number of separate inflatable chambers, diverters, tethers, and seams, etc. (not shown), as is used in the art. The inflatable cushion 14 may be made of various materials, such as nylon and other synthetic fabrics. In various aspects, the inflatable cushion 14 and the OOP flap 16 are made of the same material. In other aspects, they may be made of different, but complementary materials, such that there is minimal or a reduced friction between the two components, as can be desired.

Figure 4:
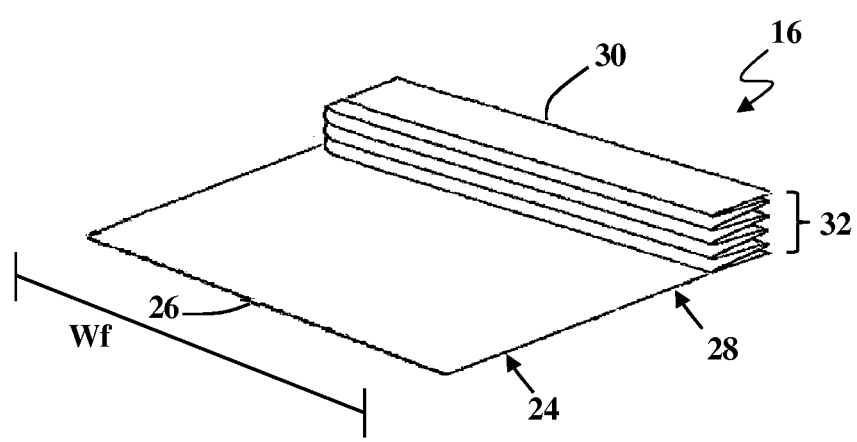
FIG. 4 is perspective view of an OOP flap, shown detached from the airbag and having a plurality of accordion-type folds.

FIG. 4 is perspective view of an OOP flap 16 according to various aspects of the present teachings. With reference to both FIGS. 3 and 4, the OOP flap 16 can generally be described as including a first portion 24 having a first end 26, and a second portion 28 having a second end 30 opposite from the first end 26. As shown in FIG. 3, the first end 26 of the OOP flap 16 may be attached, i.e., fixedly secured, to the inflatable cushion 14 at a suitable location. In other aspects, the first end 26 may be attached to the airbag module 12, or in some instances, the first end 26 of the first portion 24 is coupled to an inside portion of a dust cover 15 of the airbag module 12. The second end 30 may remain free from attachment during both storage and deployment of the inflatable cushion 14.

The second portion 28 of the OOP flap 16 preferably has a suitable length such that the OOP flap can properly deploy having a trajectory over a passenger or object, such as an infant car seat. In certain aspects, in order to fit in an overlying relationship with the inflatable cushion 14 when in the pre-deployment storage position, the second portion 28 may be shaped to form a plurality of accordion-type folds 32, as best shown in FIG. 4, configured to unfurl upon deployment of the inflatable cushion 14 and ultimately control and/or alter a trajectory of the inflatable cushion 14 during the deployment, leading to the fully inflated state as depicted in FIG. 3. The number of accordion folds, as well as their size dimensions, may vary by design.

Figure 5A:
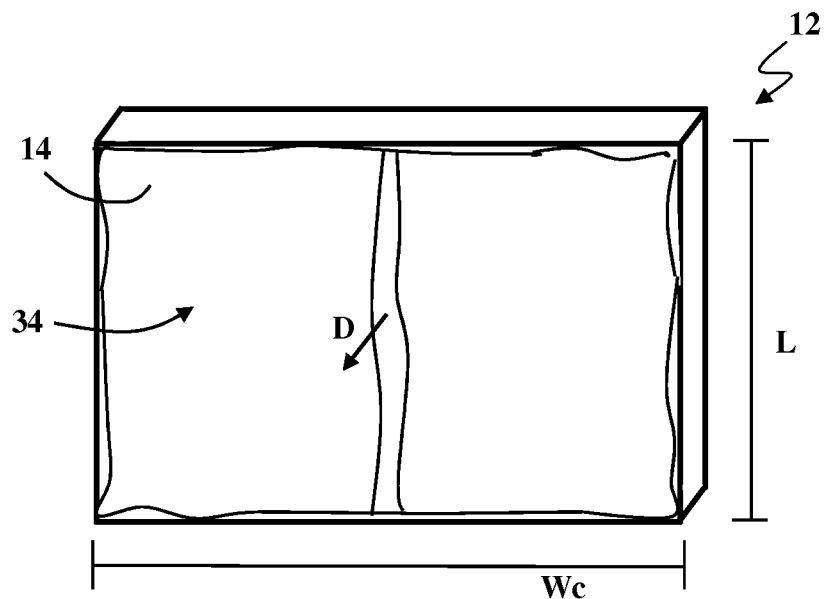
FIG. 5A is a top plan view of a folded inflatable cushion disposed with an airbag module.

FIG. 5A is a top plan view of an airbag module 12 containing a folded inflatable cushion 14. In various aspects, the inflatable cushion 14 may be shaped having a desired folding pattern for the intended use. Thus, the inflatable cushion 14 may be shaped having a variety of different folds in order to obtain one or more desired deployment conditions. In various aspects, the airbag module 12 can normally be referred to as having six sides or surfaces. For example, two major surfaces and four respective side surfaces. Generally, the folded inflatable cushion 14 is shaped to be contained within the airbag module 12 and to at least partially define an exposed major surface that faces a direction of deployment as indicated by directional Arrow D. As shown in FIG. 5A, the exposed major surface may define a substantially planar, rectangular shaped surface, as designated by reference number 34.

The width of the inflatable cushion 14 is designated by $W_c$ in FIG. 5A. The first and second portions 24, 28 of the OOP flap 16 may generally have a uniform width dimension $W_f$, as shown in FIG. 4, prior to any folding. In various aspects, the width $W_f$ of the OOP flap 16 may be substantially equal to the width dimension $W_c$ of the inflatable cushion 14 as folded within the airbag module 12.

Figure 5B:
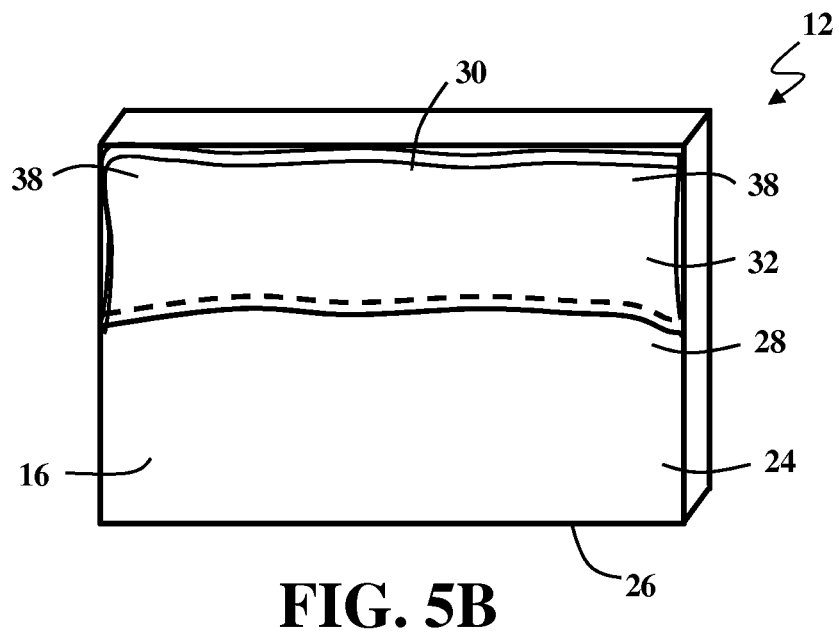
FIG. 5B is a top plan view of an airbag module illustrating an OOP flap positioned directly over the folded inflatable cushion.

FIG. 5B is a top plan view of an airbag module 12 illustrating an OOP flap 16 positioned over the folded inflatable cushion 14 of FIG. 5A. As shown, with a generally rectangular shape, the OOP flap 16 substantially matches the shape of the major surface 34 of the folded inflatable cushion 14. It has been discovered that the use of this rectangular shaped OOP flap, when incorporated within the dust cover, has been found to lead to low deployment of the airbag, which can result in upward forces to an impacted occupant.

Figure 5C:
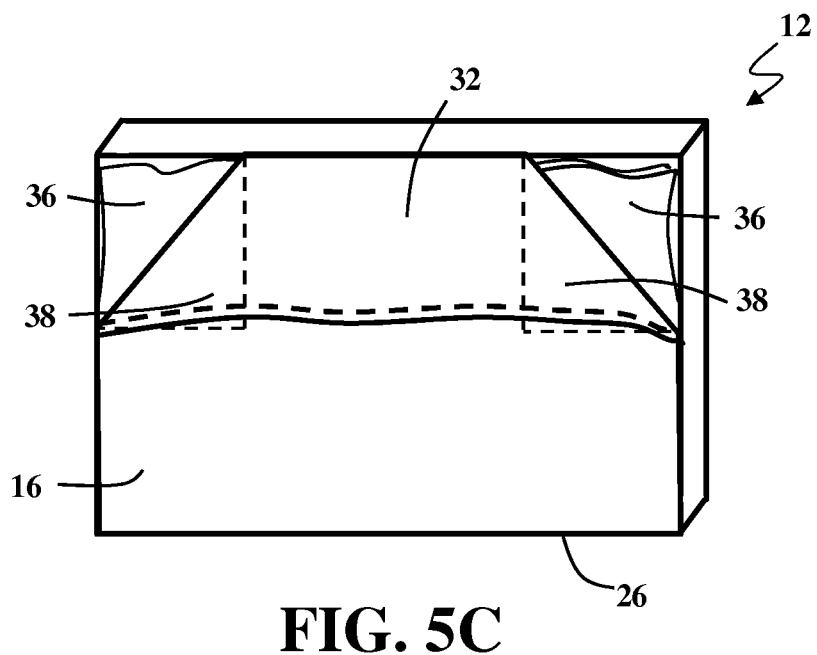
FIG. 5C is a top plan view of the airbag module of FIG. 5B illustrating a fold in the respective corners of the OOP flap.

Accordingly, the present teachings introduce size or folding changes to the OOP flap 16. In one aspect, the second portion 28 of the OOP flap 16 is provided having at least one fold or cut-out at or near the second end 30. FIG. 5C is a top plan view of the airbag module of FIG. 5B illustrating a fold in the corners of the OOP flap. When the OOP flap 16 is positioned overlying only a partial region of the major surface 34, it leaves at least a portion 36 of the major surface 34 of the folded inflatable cushion 14 free from contact with the OOP flap 16. It has been found that this configuration can substantially impact the trajectory and kinematics of the inflatable cushion deployment. For example, this reduces interaction of the OOP flap 16 and the inflatable cushion 14 upon deployment and, as a result, cause the airbag to deploy in a more desirable upward direction.

In various aspects, the second end 30 may generally define at least two opposing corners 38. At least one or both corners 38 may be folded over, particularly in an inward direction, in order to reduce a contact area between the OOP flap 16 and the major surface 34 of the folded inflatable cushion 14. In other designs, it is envisioned that one or more corners 38 may be folded in an outward direction, or one corner may be folded in an inward direction, and one corner may be folded in an outward direction. In aspects where the second portion 28 defines a plurality of accordion-type folds 32, opposing corners of the accordion-type folds 32 are further folded over, preferably in an inward direction.

Figure 5D:
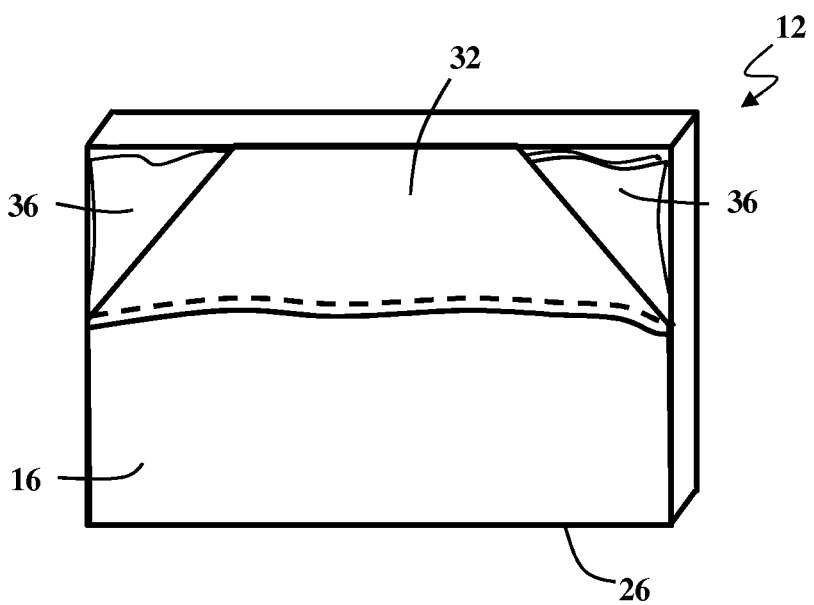
FIG. 5D is a top plan view of the airbag module of FIG. 5B illustrating a cut-out of material from the corners of the OOP flap.

In certain aspects, it may be beneficial or preferred that instead of the one or more corners being folded over, at least a portion of material from at least one corner of the second end 30 is removed, for example, cut out, from the OOP flap 16. As such, FIG. 5D illustrates a top plan view of the airbag module of FIG. 5B with a cut-out of material from the corners 38 of the OOP flap 16.

In terms of the reduction in contact area between the shaped OOP flap 16 and the folded inflatable cushion 14, for example, the major surface 34 of the folded inflatable cushion 14 can define a surface area (length×width). The ends of the OOP flap 16 may be folded over (or a portion of material removed) such that greater than about 50% of the surface area still contacts the OOP flap 16 in an assembled state of the airbag apparatus. In certain other aspects, greater than about 60%, greater than about 65%, or even greater than about 70% or 75% or more of the surface area may contact the OOP flap 16 in an assembled state of the airbag apparatus.

The present teachings provide methods for adjusting kinematics of the deployment of a passenger side airbag with an OOP flap 16 positioned directly overlying a folded inflatable cushion 14 of an airbag module 12 of airbag apparatus 10. In various aspects, the method may include shaping the OOP flap 16 with a plurality of accordion-type folds 32, and to define a contact area of the OOP flap 16 less than a respective area (i.e., length×width) of a major surface 34 defined by the folded inflatable cushion 14.

The methods may include aligning the shaped OOP flap 16 over major surface 34, thereby leaving at least a portion 36 of the major surface 34 free from contact with the OOP flap 16. As discussed above, in various aspects, shaping the OOP flap 16 includes reducing the contact area by folding one or both opposing corners 38 of the OOP flap 16 in an inward direction, as shown in FIG. 5C. In other aspects, shaping the OOP flap 16 includes reducing the contact area by removing a portion of material from the OOP flap 16. In various aspects, the removed portion of material is taken from one or both of the corner regions 38.

This method of reducing the contact area, either by folding the corners or removing an amount of material (or the like) may delay the unfolding and/or deployment of the OOP flap 16. Thus, the airbag may be allowed to go through an initial deployment phase with less interaction between the OOP flap 16 and the inflatable cushion 14. For example, the folded inflatable cushion 14 may more fully exit the airbag apparatus prior to interfacing with the OOP flap 16, which can significantly change the trajectory of the airbag, while still permitting the OOP flap 16 to deploy as designed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An airbag apparatus, comprising:
an airbag module with an inflator assembly;
an inflatable cushion folded in a deflated arrangement with the airbag module and defining a major surface facing a direction of deployment; and
an out-of-position (OOP) flap shaped to cover a partial region of the major surface and configured to alter a trajectory of the inflatable cushion during deployment, the OOP flap comprising:
a first portion with a first end, the first end fixed to the airbag module or the inflatable cushion;
a second portion with a second end, the second end opposite the first end and remaining free from attachment during both storage and deployment of the inflatable cushion, the second portion having at least one fold or cut-out at the second end and being positioned overlying the partial region of the major surface, thereby leaving at least a section of the major surface free from contact with the OOP flap,
wherein the second portion has a uniform width dimension, prior to any folding, substantially equal to a width dimension of the inflatable cushion, and the second portion is shaped to form a plurality of accordion-type folds configured to unfurl and control a direction of the trajectory, further wherein opposing corners of the accordion-type folds are further folded over in an inward direction.

2. The airbag apparatus of claim 1, wherein the second end defines two opposing corners, at least one corner being folded over in an inward direction to reduce a contact area between the OOP flap and the major surface of the inflatable cushion.

3. The airbag apparatus of claim 2, wherein both opposing corners are folded over in an inward direction.

4. The airbag apparatus of claim 2, wherein material from at least one corner of the second end is removed.

5. The airbag apparatus of claim 1, wherein the major surface defines a surface area and greater than 50% of the surface area contacts the OOP flap in an assembled state of the airbag apparatus.

6. The airbag apparatus of claim 5, wherein greater than 65% of the surface area contacts the OOP flap in an assembled state of the airbag apparatus.

7. The airbag apparatus of claim 1, wherein the first end of the first portion is coupled to the airbag module.

8. The airbag apparatus of claim 7, wherein the first end of the first portion is coupled to an inside portion of a dust cover of the airbag module.

9. The airbag apparatus of claim 1, wherein the second portion of the OOP flap defines a substantially rectangular outer perimeter in an unfolded state.

10. The airbag apparatus of claim 1, wherein the OOP flap and the inflatable cushion are made of the same material.

11. A passenger side airbag apparatus, comprising:
an airbag module with an inflator assembly;
an inflatable cushion folded in a deflated arrangement with the airbag module and defining a major surface, the major surface facing a direction of deployment and defining a surface area; and
an out-of-position (OOP) flap shaped to cover a partial region of the major surface and configured to alter a trajectory of the inflatable cushion during deployment, the OOP flap comprising:
a first portion with a first end fixed to the airbag module;
a second portion having a uniform width dimension, prior to any folding, substantially equal to a width dimension of the inflatable cushion, the second portion defining a second end opposite the first end and remaining free from attachment during both storage and deployment of the inflatable cushion, the second portion having a plurality of accordion-type folds configured to unfurl and control a direction of the trajectory and defining opposing corners, at least one of the corners being folded over in an inward direction, thereby leaving at least a section of the major surface free from contact with the OOP flap.

12. The airbag apparatus of claim 11, wherein the airbag module comprises a dust cover, and the first end of the first portion is coupled to an inside portion of the dust cover.

13. The airbag apparatus of claim 11, wherein greater than 50% of the surface area contacts the OOP flap in an assembled state of the airbag apparatus.

14. The airbag apparatus of claim 13, wherein greater than 65% of the surface area contacts the OOP flap in an assembled state of the airbag apparatus.

15. A method for adjusting kinematics of a deployment of a passenger side airbag with an out-of-position (OOP) flap positioned overlying a folded inflatable cushion of an airbag apparatus, the method comprising:
shaping the OOP flap with a plurality of accordion-type folds and to define a contact area less than a respective area of a major surface defined by the folded inflatable cushion wherein the OOP flap includes: a first portion with a first end fixed to an airbag module, and a second portion having a uniform width dimension, prior to any folding, that is substantially equal to a width dimension of the inflatable cushion; and
aligning the shaped OOP flap over the major surface, thereby leaving at least a portion of the major surface free from contact with the OOP flap.

16. The method of claim 15, wherein shaping the OOP flap further comprises reducing the contact area by folding one or both opposing corners of the OOP flap in an inward direction.

17. The method of claim 15, wherein shaping the OOP flap comprises reducing the contact area by removing a portion of material from the OOP flap.

18. The method of claim 15, wherein the shaping and aligning of the OOP flap delays a deployment of the OOP flap, thereby allowing the folded inflatable cushion to exit the airbag apparatus prior to interfacing with the OOP flap.

* * * * *